July 20, 1954 G. W. NEESEN 2,684,262
MACHINERY PACKING
Filed April 15, 1949 2 Sheets-Sheet 2
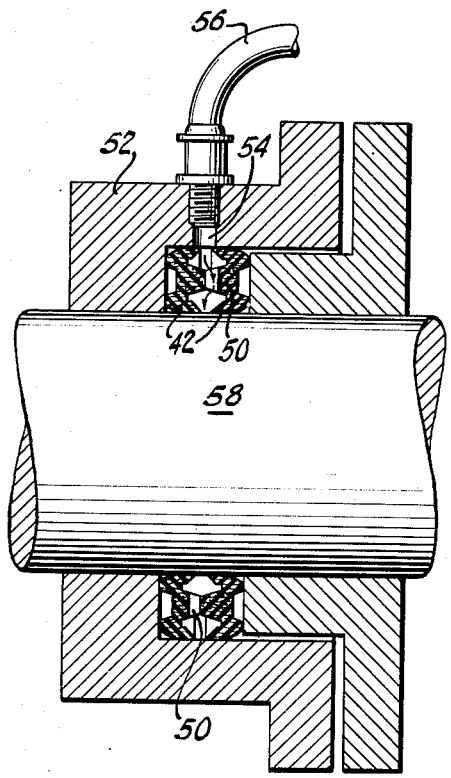
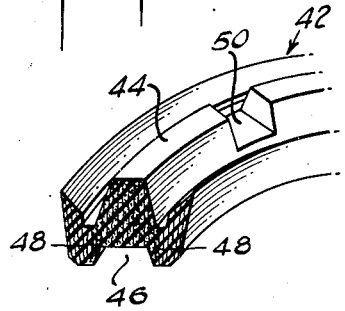
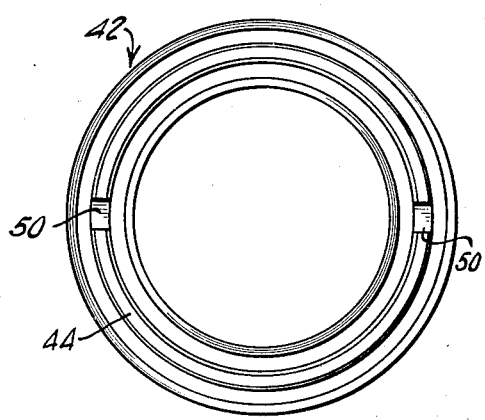
INVENTOR
GERALD W. NEESEN.
BY Virgil C. Kline
ATTORNEY Patented July 20, 1954

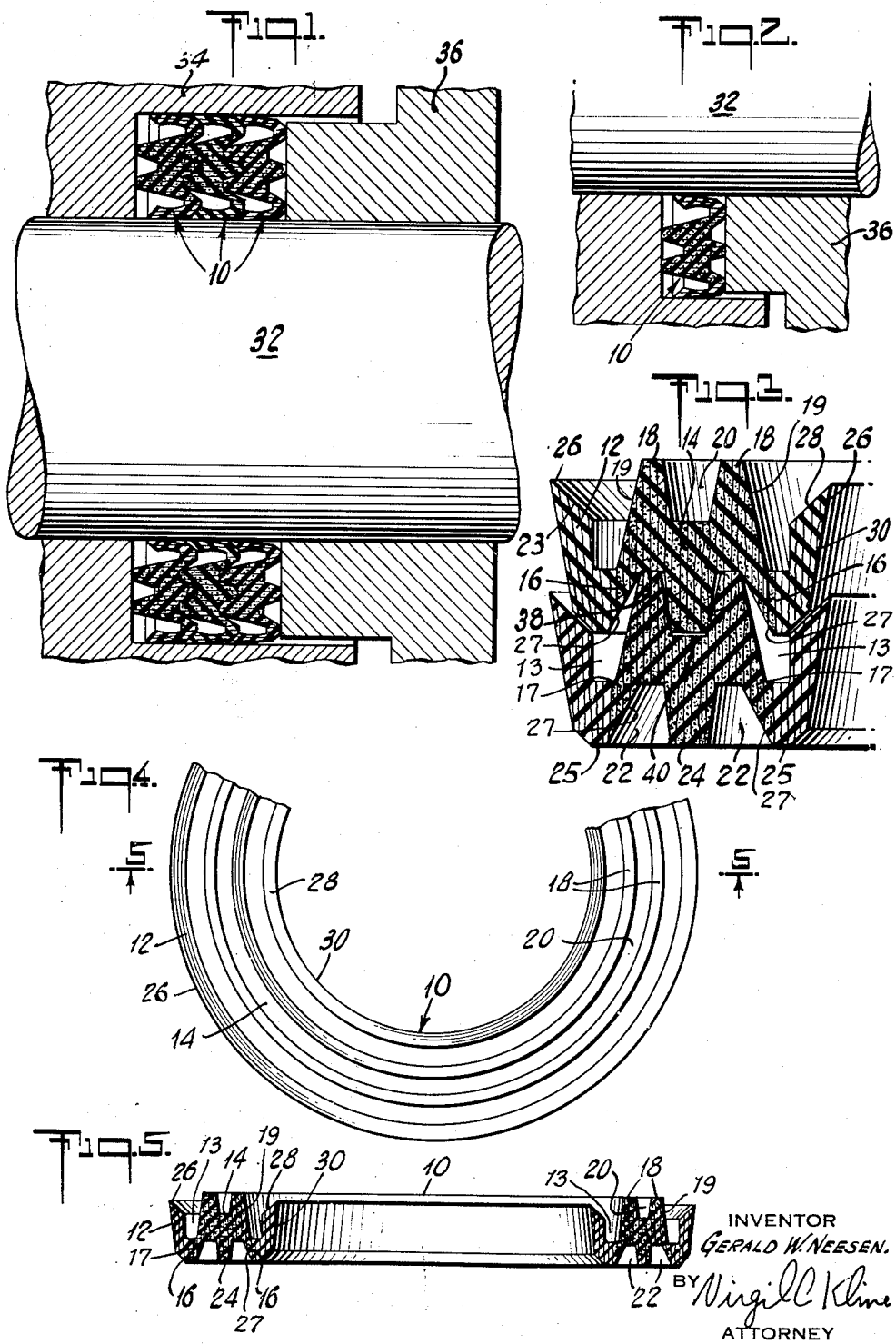

2,684,262

UNITED STATES PATENT OFFICE 2,684,262

MACHINERY PACKING

Gerald W. Neesen, Somerville, N. J., assignor to Johns-Manville Corporation, New York, N. Y., a corporation of New York Application April 15, 1949, Serial No. 87,810

16 Claims. (Cl. 288—5)

The instant invention relates to improvements in packings for making relatively fluid-tight seals between fixed and movable parts of machines and other devices; for example, packings for rods, plungers, pistons, etc., employed in pumps, compressors, hydraulic presses and similar equipment. The packings may be used for sealing against water, oil, steam, air, gas and other media.

For the services mentioned above, packings of various types have been employed. Such packings are in the form of rings and have sealing lips for engagement with the rod or other movable surface. One or more of the packings is used, depending upon the nature of the packing, the space available in the stuffing box, and the fluid pressures involved. A principal object of the instant invention is the provision of an improved packing of this general type which will eliminate many of the disadvantages of the conventional packings and provide longer wear and greater efficiency.

Another object of the invention is the provision of a packing which requires no separate header and follower rings, filler ring, or the like.

Another object of the invention is the provision of a packing ring constructed to readily center with other similar rings in the stuffing box.

Another object of the invention is the provision of a packing permitting free movement of the sealing lips for adjustment irrespective of the gland pressure applied to the packings in the stuffing box. That is, the construction prevents distortion of the sealing lips or the pressing of the rings into substantially a solid mass by gland pressure.

Another object of the invention is the provision of a packing ring which can be used either alone or with similar rings. In the latter case, the rings may be assembled into a set in the stuffing box, or may be pre-assembled to form a cartridge type packing of a length to fit the stuffing box. A further object of the invention is the provision of a packing ring construction whereby one packing ring in a set of rings may be reversed for suction, vacuum or lift.

A still further object of the invention is the provision of a packing ring of generally W-shape in cross-section and so designed that, when employed with similar rings in a set, the set will not have a solid cross-section at any point, thereby permitting the packing to swell without resultant jamming or excessive wear.

A still further object of the invention in one embodiment thereof is the provision of a packing ring having means for the passage of a lubricant to the sealing lips.

Briefly described the invention resides in a packing ring having outer sealing lips carried by a central body section of a harder material having greater compression resistance than the lips. The packing ring is designed to have the body section resist the compressive stresses set up in the stuffing box to leave the lips free from distortion for performance of their sealing function. The rings are generally W-shape in cross-section and nest together when employed as a set, the nesting insuring centering of the rings in the packing space. However, the nesting parts are designed to avoid having any portion of the packing of solid cross-section whereby the packing may swell under the influence of the fluids to which it may be subjected in service.

My invention will be more fully understood and further objects and advantages thereof will become apparent when reference is made to the more detailed description of a preferred embodiment of the invention which is to follow, and to the accompanying drawings in which:

Fig. 1 is a sectional view through a stuffing box employing a plurality of rings embodying the instant invention;

Fig. 2 is a view similar to Fig. 1 illustrating a packing consisting of a single ring;

Fig. 3 is a cross-sectional view on an enlarged scale, of a packing set composed of a plurality of packing rings;

Fig. 4 is a partial plan view of a packing ring embodying the instant invention;

Fig. 5 is a sectional view, taken on the line 5—5 of Fig. 4;

Fig. 6 is a view similar to Fig. 1 illustrating a modified packing ring;

Fig. 7 is a plan view of the packing ring shown in Fig. 6; and,

Fig. 8 is a detail view on an enlarged scale and partially in section, of the packing ring of Fig. 7.

Referring now to the drawings there is shown a packing ring 10 consisting of lip sections 12 carried by a central body section 14 (section 14 being identified by stippling in Figs. 3 and 5). The body section is constructed to have greater resistance to compression and distortion than the lip sections and is shaped, as will be later more fully described, to resist any axially applied pressure such as the gland pressure and, hence, prevent distortion of the lip sections through their being jammed together or against the end of the box. The desired rigidity and compression resistance of the body section may be obtained in any suitable way. Both the lip and body sections will ordinarily be formed of multiple layers of a fabric such as asbestos, cotton, or the like, depending upon the field of use of the packing, impregnated or coated with natural rubber or any of the synthetic rubbers, again depending upon the field of use of the packing. The proper selection of the fabric and rubber for different conditions is well understood in the art. To reinforce and rigidify the body section it has been found preferable to impregnate the fabric of this section with a stiffening resin, for example, a phenol-formaldehyde, urea-formaldehyde, vinyl, or other hardenable resin, preferably of the heat setting type, available on the market. The impregnation of the fabric of the body section with such resin gives the body section the desired properties. However, any other suitable way of hardening this section may be used.

In making the packing, the multiple layers of fabric for the body section are first impregnated with the selected hardening resin and these and the multiple layers of fabric for the lip sections are impregnated or coated with the selected rubber binder. The fabric carrying the binder is then placed in a mold of the required contour and subjected to heat and pressure. The fabricating operations, except for the special shape of the mold and the use of resin impregnated fabric for the body section, follow conventional practice.

Referring now specifically to Figs. 3, 4 and 5, the packing is of approximately W-shape in cross-section, axially forwardly and rearwardly extending, relatively yieldable lip sections 12 being integrally connected to the relatively non-yieldable forward end of the body section 14 on approximately the lines 16. The lip sections 12 have axially forwardly and laterally extending portions joined to the main body section adjacent their rearward ends by relatively narrow or thin neck sections 17, which may be considered a part of either the lip sections or body section, and which, with the forwardly and laterally extending portions of the lip sections and with the body section define axially forwardly opening annular recesses or pockets 13 laterally of the body section. The body section includes concentric annular axially forwardly opening ribs 18, spaced inwardly from the lip sections and separated from each other by an annular pocket or recess 20. The ribs project forwardly of the lip sections 12. The base of the body section and the rearwardly extending portions of the lip sections, with the neck sections 17, define concentric annular axially rearwardly opening pockets or recesses 22 out of axial alignment with pockets 13 and 20, but in axial alignment with ribs 18 and adapted to receive the ribs of an adjacent packing ring (see Figs. 1 and 3). The bases of the recesses 13 and 22 are disposed laterally and axially adjacent to each other and define between their closest adjacent portions the width dimensions of the neck sections 17. It will be noted that this width dimension is substantially less than the dimensions of the adjacent portions of the body and lip sections taken in the same direction. The neck sections thus formed serve somewhat in the nature of hinge regions for flexure of the lip sections thereabout, the degree of flexibility about the "hinge" being controlled in part by the degree of rigidity of the material from which the neck sections are made. When the neck sections are made from the same material as the body section, as illustrated, and that material is relatively rigid, the flexibility is obviously less than it would be if the neck sections were formed entirely of a less rigid material such as that from which the lip sections are made. Pockets 22 define a central annular projection 24 in axial alignment with pocket 20. The outer end of rib 24 is in approximate radial alignment with the heels 25 of the lip sections. The open side of pocket 20 is somewhat wider than the base of rib 24 and the open sides of pockets 22 are substantially wider than ribs 18 opposite the inner end of pocket 20, whereby the material of the packing may expand or swell considerably before completely filling the pockets, and also the width of the necks connecting the lip and body sections is reduced. The described arrangement of the body section, lip sections, pockets or recesses, and ribs is such as to present in cross section no substantial solid portion involving both the body sections and lip sections on a diameter.

Lip sections 12 include sealing lips 26 defined by upper downwardly and inwardly beveled surfaces 28 and downwardly and inwardly beveled outer walls 30, surfaces 28 and walls 30 converging at acute angles at the lips. The heels of the lip sections are beveled at the same angle as the upper surfaces of the lip sections and have their laterally outermost extremities closer to the body section than their lips. It will be noted that the thinnest portions of the neck sections are equal to only a minor portion of the length of the lip sections from their lips to their heels. The heights of the lip sections, the depth of pocket 20, and the height of rib 24 are so proportioned that, when the rings are loosely assembled as illustrated in Fig. 3, the end of rib 24 of a higher ring is slightly spaced from the inner end of pocket 20 of a lower ring. The heights or axial dimensions of each rib 18 of the lower ring are at least as great as the depth or axial dimension of the corresponding axially aligned pocket of the same, as well as the next higher similar ring, so that the ends of ribs 18 of the lower ring are in abutment with the inner ends of pockets 22 of the higher ring. The respective laterally outer portions of the beveled lower edges of the lip sections of the higher ring are slightly spaced axially from the laterally inner portions of the corresponding beveled upper surfaces 26 of the lower ring.

It will be noted that the body section has outwardly inclined side wall surfaces 19 laterally opposite the lip sections and forwardly of the neck sections, and that the region of connection between the lip sections and body section, including the neck sections 17, provide respective side wall surfaces 27 on the sides thereof toward the body section extending rearwardly with respect thereto and laterally outwardly at a greater angle of inclination than the side wall surfaces 19.

One or more of the packing rings may be employed in the stuffing box, depending upon the depth of the box. Ordinarily a plurality of the rings will be accommodated, as illustrated in Fig. 1, the rings being pressed together, with their lips in sealing engagement with the shaft 32 and wall 34 of the stuffing box, by gland 36. Under the pressure of the gland the end of rib 24 of a higher ring is brought into abutment with the inner end of pocket 20 of the next lower ring, and the beveled lower edge of the lip section of the higher ring is brought into contact with the beveled upper surface 28 of the lower ring. The header and follower rings required in conventional packing, such as V-rings, are unnecessary, projecting ribs 18 of the forward packing serving the function of a header ring and preventing crushing of the sealing lips against the end of the stuffing box, and rib 24 of the rearmost packing serving as the follower ring to take the pressure of the gland. The elimination of the header and follower rings not only results in a saving of the cost of these parts, but also reduces the size of the stuffing box required for a given number of packing rings.

Due to the continuity of the relatively non-yieldable, compression-resistant body sections from end to end of the set of packing rings, the pressure exerted by the gland 36 will be resisted thereby. Hence, there will be no distortion of the lips or pressing of the set into a solid mass by excessive gland pressure as often occurs with other types of packings, and a free space will always be provided for each lip to perform its sealing function, irrespective of pressure variations. At the same time the engagement of the heel of the lip section of a superposed ring with the beveled lip of an underlying ring insures that the rings will not collapse or turn inside-out under severe service pressures.

As will be observed, the rings are self-centering, the ribs of one ring fitting within the recesses or pockets of adjacent rings. However, the open spaces between the ribs and the walls of the pockets, and the open spaces between the lips and the body section allow for swelling of the rings as may occur when they are subjected to the action of the fluids met in service.

The free space between the lips and the outer wall of a superposed packing allows the pressure to exert its force on each individual lip, insuring an efficient sealing action. Where desired for suction, vacuum or lift on the return stroke, one or more of the packing rings may be reversed without modification.

In packing a stuffing box with a multiple number of packing rings, as illustrated in Fig. 1, the rings may either be inserted individually or pre-assembled into a cartridge type unit, as shown for example in Fig. 3.

A singe packing ring of the instant invention may be used alone in a shallow stuffing box as a complete packing unit, as illustrated in Fig. 2. Here, as before, the body section takes the stress of the gland and leaves the lips free for sealing action on the box and shaft. Whether used alone or in multiples, the packing rings may be endless, or split for more ready assembly on the shaft, in accordance with conventional practice.

Referring now to Figs. 6, 7 and 8, a modified construction of the packing is shown, particularly for use where it is desired to lubricate the packing in the stuffing box. In this embodiment the individual packing rings 42 (see particularly Figs. 7 and 8), are of generally W-shape, as before, but the body section includes but a single, forwardly projecting rib 44 and a single, rearwardly opening recess or pocket 46. The relatively hard and compression resistant body section, indicated by stippling, extends to substantially the lines 48. Rib 44 is traversed by one, or preferably a plurality of, passages 50. In the use of rings 42 in a lubricated packing, the rings are placed in reversed positions with their ribs 44 abutting, as illustrated in Fig. 6. The stuffing box 52 is provided with an inlet 54 connected to a lubricant supply by means of tube 56. The lubricant is forced from the supply between the outer lips of the opposed cups, the lubricant circulating through passageways 50 to the rod 58 to lubricate the rod at the points of contact of the inner packing lips. The passageways also serve to equalize the pressure at the opposite sides of the packing. It will be appreciated that, although only one pair of the packings has been shown in Fig. 6, a plurality of pairs may similarly be employed for deeper boxes. Also, the ring packings of Figs. 7 and 8 may be used in the same manner as those shown in Figs. 1 and 2 if desired.

Having thus described my invention in rather full detail, it will be understood that these details need not be strictly adhered to but that further changes and modifications may suggest themselves to one skilled in the art, all falling within the scope of the invention as defined by the subjoined claims.

What I claim is:

1. A packing set comprising a pair of packing rings, each including a relatively non-yieldable body section and relatively yieldable lip sections carried by the body section on opposite sides thereof and spaced therefrom for the greater portion of the length thereof, said lip sections having forwardly projecting end portions inclined outwardly to form sealing lips, said body section having an annular rib projecting forwardly of said lips, said ribs having transverse passageways, and said packing rings being positioned with their annular ribs in axially abutting relationship and with their lips facing each other but in axial spaced relationship.

2. A packing ring comprising an annulus approximately W shape in cross section and including a body section and annular lip sections carried by and spaced laterally from the body section for the greater portion of the length thereof to define therewith annular, forwardly opening pockets, said lip sections each including a sealing lip, said body section having an annular forwardly projecting rib, an annular rearwardly projecting rib, and annular rearwardly opening recesses formed out of axial alignment with said pockets, said pockets and said recesses extending axially inwardly of the packing ring at least to such an extent that their bases lie substantially opposite each other, laterally, one of said ribs extending beyond the lip sections axially in one direction and the other of the ribs extending at least as far as the lip sections axially in the opposite direction, the arrangement of the body section, ribs, pockets, recesses, and lip sections being such as to present in cross section no substantial solid portion involving both the body section and lip sections on a diameter.

3. The packing ring defined in claim 2 in which said pockets and said recesses establish relatively narrow regions of the body section, and in which said lip sections are joined to the body section at said narrow regions, said narrow regions serving as hinges for flexure of the lip sections thereabout.

4. A packing ring comprising an annulus approximately W shape in cross section and including a body section and annular lip sections carried by and spaced laterally from the body section for the greater portion of the length thereof to define therewith annular forwardly opening pockets, said lip sections each including a sealing lip, said body section having concentric annular ribs projecting forwardly of said sealing lips defining with said body section a central forwardly opening annular pocket, said body section having an annular rearwardly projecting rib and having annular rearwardly opening recesses formed out of axial alignment with said first mentioned pockets, said first mentioned pockets and said recesses extending axially inwardly of the packing ring at least to such an extent that their bases lie substantially opposite each other, laterally, said rearwardly projecting rib extending axially rearwardly at least as far as said lip sections, the arrangement of the body section, ribs, pockets, recesses, and lip sections being such as to present in cross section no substantial solid portion involving both the body section and lip sections on a diameter.

5. The packing ring defined in claim 4 in which the forwardly projecting ribs are in substantial axial alignment with the rearwardly opening recesses, and in which the central forwardly opening pocket is in substantial axial alignment with the rearwardly projecting rib.

6. A packing ring as defined in claim 5 and adapted for nesting assembly in a set with similar rings, the central forwardly opening pocket and the rearwardly opening recesses being wider, respectively, than said rearwardly projecting rib and the forwardly projecting ribs, the depths of the pockets, heights of the ribs, and heights of the lip sections being so proportioned that in a loose nesting assembly of a plurality of the rings the tips of the forwardly projecting ribs abut the bases of the rearwardly opening recesses, but clearance is provided between the lip sections of adjacent rings, and between the tip of the rearwardly projecting rib of one ring and the base of the central forwardly opening pocket of another in the assembly, whereby under operative pressures swelling of the packing material is accommodated without undue increase in friction and wear, while the lip sections of adjacent packings in the set come into abutment to provide an efficient seal.

7. A packing set comprising in assembly a pair of packing rings, each of said packing rings comprising an annulus including a body section and lip sections carried by said body section and spaced therefrom for the greater portion of the length thereof, said lip sections having sealing lips on opposite sides of the body section and concentric thereto, said body section having concentric annular ribs projecting forwardly of the lips, and concentric annular rearwardly opening pockets, said pockets of one ring receiving the forwardly projecting ribs of an adjacent packing of the set, said pockets being wider than said ribs to allow for swelling of the material of the packing, the lip sections, ribs, and pockets being so dimensioned axially that the lip sections of adjacent rings of the set in loose assembly are slightly spaced from each other but come into abutment under operative conditions.

8. In a packing set, a pair of packing rings assembled in axially adjacent relation, each of said packing rings comprising an annulus including, an annular body section and a concentric annular lip section having a portion spaced laterally from said body section and extending axially forwardly with respect to said body section, said lip section being connected to said body section by a thin neck section, said body section having concentric annular ribs projecting axially thereof in one direction and concentric annular pockets opening axially in the other direction, said pockets being wider than said ribs, said forwardly extending lip portion having a forward end surface terminating in an outermost extremity forming a sealing lip, said lip section having a rearward end surface having its laterally outermost extending portion disposed laterally closer to said body portion than said sealing lip, the ribs of the other ring abutting the bottoms of the pockets of the other ring, and the laterally inner portion of the forward end surface of the lip section of said other ring being axially closely adjacent to the laterally outer portion of the rearward end surface of the lip section of said one ring in loose assembly, but coming into abutment therewith under operative conditions.

9. The invention as defined in claim 8, the forward and rearward end surfaces of the lip section of each ring being substantially flat and parallel to each other and axially forwardly and laterally outwardly inclined with respect to said body section.

10. A packing ring comprising an annulus including an annular body section and an annular lip section having a portion spaced laterally from said body section and extending axially forwardly with respect to said body section, a neck section connecting said lip section to said body section and, with said forwardly extending lip portion and said body section, defining an axially forwardly opening recess laterally of said body section, said lip section having an axially rearwardly extending portion defining with said neck and body sections an axially rearwardly opening recess out of axial alignment with said forwardly opening recess, the bases of said recesses being disposed laterally and axially adjacent to each other and defining between their closest adjacent portions the width dimension of said neck section, said width dimension being substantially less than the dimensions of the adjacent portions of said body and lip sections taken in the same direction, said neck section serving as a hinge for flexure of the lip section thereabout.

11. A packing ring comprising an annulus including an annular body section and an annular lip section having a portion spaced laterally from said body section and extending axially forwardly and laterally with respect to said body section, a neck section connecting said lip section to said body section and, with said forwardly and laterally extending lip portion and said body section, defining an axially forwardly opening recess laterally of said body section, said forwardly and laterally extending lip portion having a forward end surface terminating in an outermost extremity forming a sealing lip, said lip section having a portion extending axially rearwardly of said body section and defining with said neck and body sections an axially rearwardly opening recess, said rearwardly extending portion having a rearward end surface having a laterally outermost extending portion which is laterally closer to said body section than said sealing lip, said neck section having a minimum thickness dimension determined by and measured between said recesses, said minimum thickness dimension being equal to a minor portion of the length of said lip section from said sealing lip to the rearward extremity of said rearwardly extending portion.

12. A packing ring as defined in claim 11 in combination with a similar ring arranged adjacent thereto in axial alignment, the body sections of the adjacent rings abutting each other and the laterally inner portion of the forward end surface of the lip section of one ring being closely adjacent to the laterally outward portion of the rearward end surface of the lip section of the other ring in loose assembly, but coming into abutment therewith under operative conditions.

13. The combination defined in claim 12, in which the forward and rearward end surfaces of the lip section of each ring are flat and substantially parallel and inclined forwardly and laterally away from said body section.

14. In a packing set, a pair of similar packing rings assembled in axially adjacent relation, each of said packing rings comprising, an annular body section and a concentric annular lip section spaced laterally from said body section and extending axially forwardly and laterally with respect to said body section, a neck section having a thickness equal to only a minor portion of the length of said lip section connecting said lip section to said body section and, with said forwardly and laterally extending lip portion and said body section defining an axially forwardly opening recess laterally of said body section, said forwardly and laterally extending lip portion having a forward end surface having a laterally outermost portion terminating in a sealing lip, said lip section having an axially rearward end surface having a laterally outermost extremity laterally closer to said body section than said sealing lip, the body sections of the adjacent rings abutting each other, and the laterally inner portion of the forward end surface of the lip section of one ring being axially closely adjacent to the laterally outer portion of the rearward end surface of the lip section of the other ring in loosely assembled relation but in contact therewith under operative conditions.

15. In a packing set, a pair of packing rings assembled in axially adjacent relation, one forward of the other, each of said packing rings comprising, an annular body section and a forwardly extending annular lip section alongside the body section and spaced therefrom, and a relatively flexible neck section connecting said lip section to said body section, the rearward end of the body section of the forward ring being in abutment with the forward end of the body section of the rearward ring, said lip section of at least the forward ring having a rearward portion extending axially rearwardly with respect to the body section of said forward ring and disposed laterally alongside of the forward end of the body section of the rearward ring, said neck section of said forward ring joining said rearward portion to the body section of the forward ring, said rearward portion of the lip section of the forward ring beng spaced from the forward end of the body section of the rearward ring to provide a clear space laterally adjacent of the forward end of the body section of the rearward ring to accommodate flexure of the lip section of the forward ring about its neck section in the assembled set.

16. The invention defined in claim 15, in which each of said lip sections is inclined forwardly and laterally away from the body section of its respective ring, and in which the lip section of the rearward ring has a forward end having a portion lying laterally beyond the laterally outer portion of the rearward end of the lip section of the forward ring, and a portion lying axially rearwardly of and closely adjacent to the laterally outer portion of the rearward end of the lip section of the forward ring in loosely assembled relation but adapted to come into contact therewith under operative conditions.

References Cited in the file of this patent

UNITED STATES PATENTS

| Number | Name | Date |
|---|---|---|
| 1,035,279 | Walker | Aug. 13, 1912 |
| 1,246,089 | Greenoe | Nov. 13, 1917 |
| 1,607,943 | Carson | Nov. 23, 1926 |
| 2,264,147 | Dunlevy | Nov. 25, 1941 |
| 2,372,095 | Leistensnider | Mar. 20, 1945 |
| 2,417,828 | Joy | Mar. 25, 1947 |
| 2,482,029 | Reynolds | Sept. 13, 1949 |

FOREIGN PATENTS

| Number | Country | Date |
|---|---|---|
| 2,231 | Great Britain | Feb. 1, 1894 |
| 7,142 | Great Britain | of 1909 |
| 14,337 | Great Britain | Oct. 30, 1884 |